March 7, 1950 R. W. STROBEL 2,499,981
ADJUSTABLE CLAMPING DEVICE
Filed April 16, 1949
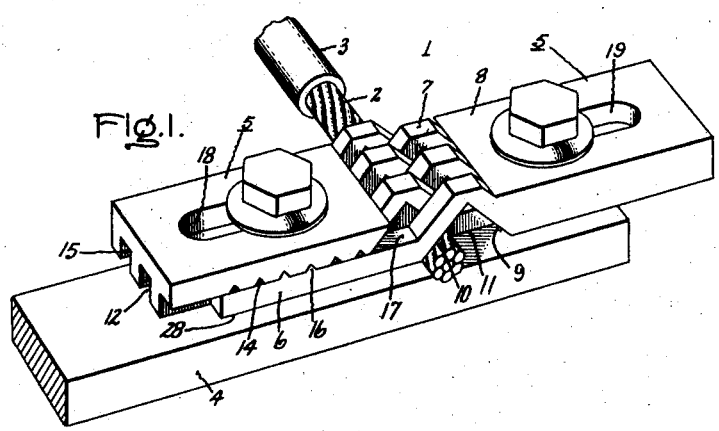
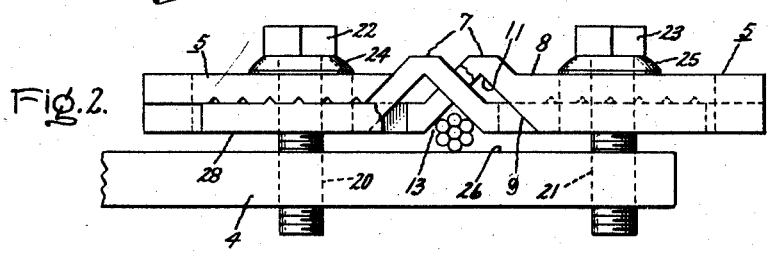
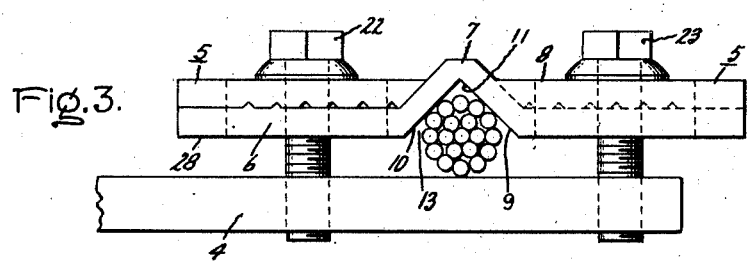
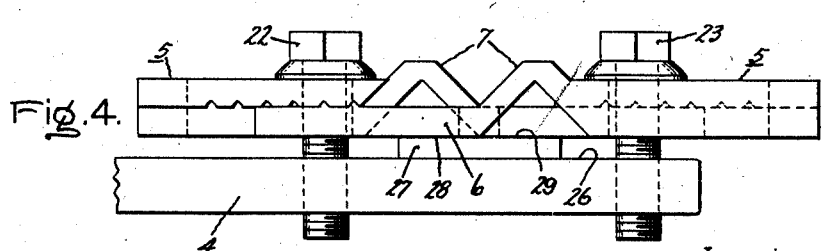
Inventor:
Rudolph W Strobel,
by Ernest C Britton
His Attorney.

Patented Mar. 7, 1950

2,499,981

UNITED STATES PATENT OFFICE 2,499,981

ADJUSTABLE CLAMPING DEVICE

Rudolph W. Strobel, Pittsfield, Mass., assignor to General Electric Company, a corporation of New York Application April 16, 1949, Serial No. 87,872

4 Claims. (Cl. 24—135)

1

This invention relates to clamping devices and more particularly to an adjustable clamping device by which a cable, rod, flat bar and the like of any diameter or width within certain defined limits can be secured to a flat surfaced member by adjusting the clamping device to accommodate the particular rod, cable or flat bar.

There are many conventional types of clamping devices for securing a rod or cable of one or two sizes to a flat surfaced member and there are many types of clamping devices for securing a flat bar to a flat surfaced member. However, to the best of my knowledge there are no clamping devices which may be adjusted to secure any of a variety of sizes of cables, rods or flat bars to a flat surfaced member.

Such a device would be advantageous, for example, as a terminal means for a bus bar where any of several different sizes of cables may be attached thereto or to which a flat bar may be secured. One type of adjustable clamping device could then be standardized for various sizes of cables or bars within the range of the device.

It has further been shown in practice that a cable comprising stranded wires when secured in a V-shaped clamp is less likely to become loose due to vibration or movement of the part of the cable extending beyond the clamp.

It is therefore an object of this invention to provide an adjustable clamping device suitable for securing a cable or rod of any of a range of sizes to a flat surfaced member.

Another object is to provide an adjustable clamping device to secure a cable, rod or flat bar of any of a range of sizes to a flat surfaced member.

A further object is to provide an adjustable clamping device which has a V-shaped clamping jaw and which is suitable for securing a cable, rod or flat bar of any of a range of sizes to a flat surfaced member.

In general, my invention consists of an adjustable clamping device comprising two identical members having parallel arms with aligned recesses therein and arranged to adjustably cooperate one with the other to secure any one of a range of different size cables, rods or flat bars to a flat surfaced member.

For a complete understanding of my invention reference should be had to the following specification and the accompanying drawing wherein Fig. 1 is a perspective view of my adjustable clamping device as adjusted to and securing one size of cable within its range to a flat surfaced member, Fig. 2 is a side view in elevation and partly broken away of Fig. 1, Fig. 3 is a side view in elevation of my device as adjusted to and securing the largest cable within its range to a flat surfaced member, and Fig. 4 is a side view in elevation of my device as adjusted to and securing a flat bar to a flat surfaced member.

Referring to the drawing, in Fig. 1, I have shown an adjustable clamping device 1 illustrative of my invention and arranged to secure the bared end 2 of a cable 3 to a flat surfaced member 4. Clamping device 1 comprises two identical, rectangular, elongated clamping members 5 longitudinally slotted from one end thereof to form a plurality of substantially parallel arms 6 of rectangular cross-section and each having a bridge shaped portion 7 adjacent the remaining portion 8 of the clamping member. The bridge shaped portion 7 has for its lower surfaces two inclined sides 9 and 10 forming a V-shaped recess 11. The lower surfaces of the portions 8 of the clamping members 5 are recessed to form a plurality of substantially parallel rectangular grooves 12 arranged to accommodate the arms 6 of the clamping members 5 and to provide a guide therefor when the clamping members are placed in juxtaposition and moved one in the direction of the other.

To adjust the clamping members 5 for a particular cable size the bared end 2 of the cable 3 is placed between the flat surfaced member 4 and the clamping members 5 and the latter are moved together until portions of the side 10 of the bridge shaped portions 7 form a V-shaped jaw clamp 13, as shown in Fig. 2, of suitable size for the particular cable size.

To aid in the adjustment of the clamping members 5 to a particular cable size and to prevent relative movement of the members after the adjustment is made a plurality of spaced recesses 14 are formed on a surface 15 of the grooves 12 to accommodate a plurality of spaced projections 16 on the upper surface 17 of the arms 6.

Thus, when the clamping members have been adjusted for a particular cable size, certain of the projections 16 are positioned in certain of the recesses 14 and the clamping member 5 is thereby held in this adjusted position without the aid of tools.

To secure the bared end 2 of cable 3 to the flat surfaced member 4, elongated slots 18 and 19 are provided in the portions 8 of the clamping members 5, as shown in Fig. 1, and the flat surfaced member 4 is apertured and threaded as at 20 and 21 to accommodate two bolts 22 and 23 as shown in Fig. 2. Bolts 22 and 23 are provided with washers 24 and 25 and are passed through the slots 18 and 19, as shown in Fig. 1, and threaded into the apertures 20 and 21, as shown in Fig. 2. Thus by tightening the bolts 22 and 23 the adjustable clamping device 1 is drawn down upon the cable end 2 to secure the cable between the jaw clamp portion 13 of device 1 and an adjacent portion 26 of the flat surfaced member 4. The innermost of the arms 6 is made shorter than the other arms, as shown in Fig. 2, to allow the bolts 22 and 23 to pass through device 1.

To adjust the clamping members 5 for the largest size cable within the range of device 1 the clamping members 5 are moved one in the direction of the other until the largest possible jaw clamp portion 13 is formed, as shown in Fig. 3. In this adjusted position of the clamping members 5 the entire length of the sides 9 and 10 of the bridged shaped portions 7 is used to form the jaw clamp 13.

To adjust the clamping members 5 to secure a flat bar 27 the members 5 are moved away from each other until the bridge shaped portions 7 are in the positions shown in Fig. 4. In this position the lower surfaces 28 of the arms 6 form a plurality of flat surfaces in one plane adjacent to the upper flat surface 29 of the flat bar 27 and the flat bar is rigidly secured to the flat surfaced member 4 by tightening the bolts 22 and 23.

Thus in accordance with my invention, I have provided an adjustable clamping device 1 by which several sizes of cables may be secured to a flat surfaced member 4. For example, one device constructed as described above secures all cable sizes from at least Number 8 to at least Number 2/0 American Wire Gage.

As a further advantage, when a stranded cable is secured by my device, it is held in a V-shaped jaw clamp 13 which I have found in practice reduces the likelihood of such a cable becoming loose due to vibration or movement of the part of the cable extending beyond the clamping device.

A still further advantage of my clamping device is that it is easily adjusted without the aid of special tools.

Another advantage of my device is derived from the fact that in addition to securing a variety of sizes of cables or rods, the device may also be used to secure a flat bar. Also since the clamping device is formed of two identical clamping members, stock requirements and manufacturing costs are kept at a minimum.

An additional advantage is provided by my clamping device in that it may be positioned at any angle within the plane of a flat surfaced member by arranging the threaded apertures in the flat surfaced member for mounting of the device at the desired angle.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. An adjustable clamping device for securing a cable, rod and the like of various diameters to a flat surfaced member and for securing a flat bar to said flat surfaced member, said device comprising a pair of clamping members each slotted from one end thereof to form a plurality of parallel arms projecting from the remaining portion of said member, each of said parallel arms having a bridge shaped portion adjacent to said remaining portion, inclined sides on said bridge shaped portions defining symmetrical aligned recesses, said remaining portions being grooved to accommodate said parallel arms and to act as a guide therefor when said clamping members are placed in juxtaposition and moved one in the direction of the other, said inclined sides cooperating to form a jaw clamp of a size depending upon the adjustment of said clamping members one with respect to the other, said clamping members when adjusted to another position forming a plurality of flat surfaces in one plane, each of said remaining portions having an aperture therein, and means for mounting said clamping members on said flat surfaced members to secure said rod or cable between said jaw clamp and said flat surfaced member for one adjustment of said clamping members and to secure a flat bar between said plurality of flat surfaces and said flat surfaced member for another adjustment of said clamping members, said means comprising bolts positioned one in each of said apertures and secured to said flat surfaced member.

2. An adjustable clamping device for securing a cable, rod and the like of various diameters to a flat surfaced member and for securing a flat bar to said flat surfaced member, said device comprising a pair of rectangular, elongated clamping members, each of said clamping members being slotted longitudinally from one end thereof to form a plurality of parallel arms projecting from the remaining portion of said member, said remaining portions being longitudinally grooved to accommodate said parallel arms and to act as a guide therefor when said clamping members are placed in juxtaposition and moved one in the direction of the other, a bridge shaped portion on each of said parallel arms adjacent to said remaining portion of said clamping member, inclined sides on said bridge shaped portions defining symmetrical V-shaped aligned recesses, said inclined sides cooperating to form a V-shaped jaw clamp of a size depending upon the adjustment of said clamping members one with respect to the other, said clamping members when adjusted to another position forming a plurality of flat surfaces in one plane, each of said remaining portions having a longitudinal slot therein, and means for mounting said clamping members on said flat surfaced member to secure said rod or cable between said V-shaped jaw clamp and said flat surfaced member for one adjustment of said clamping members, and to secure a flat bar between said plurality of flat surfaces and said flat surfaced member for another adjustment of said clamping members, said means comprising bolts positioned one in each of said longitudinal slots and secured to said flat surfaced member.

3. An adjustable clamping device for securing a cable, rod and the like of various diameters to a flat surfaced member, said device comprising a pair of rectangular, elongated, clamping members, each of said members being slotted longitudinally from one end thereof to form a plurality of parallel arms projecting from the remaining portion of said member, said remaining portions being longitudinally grooved to accommodate said parallel arms and to act as a guide therefor when said clamping members are placed in juxtaposition and moved one in the direction of the other, a bridge shaped portion on each of said parallel arms adjacent to said remaining portion of said clamping member, inclined sides on said bridge shaped portions defining symmetrical V-shaped aligned recesses, said inclined sides cooperating to form a V-shaped jaw clamp of a size depending upon the adjustment of said clamping members one with respect to the other, each of said remaining portions having a longitudinal slot therein, and means for mounting said clamping members in said flat surfaced member to secure said rod, cable or the like between said V-shaped jaw clamp and said flat surfaced member, said means comprising bolts positioned one in each of said longitudinal slots and secured to said flat surfaced member.

4. An adjustable clamping device for securing a cable, rod and the like of various diameters to a flat surfaced member and for securing a flat bar to said flat surfaced member, said device comprising two identical, rectangular, elongated clamping members, each of said members being slotted longitudinally from one end thereof to form a plurality of parallel arms projecting from the remaining portion of said member, one of said parallel arms being centrally disposed with respect to and shorter than adjacent arms, said remaining portions being longitudinally grooved to accommodate said parallel arms and to act as a guide therefor when said clamping members are placed in juxtaposition and moved one in the direction of the other, a bridge shaped portion on each of said parallel arms adjacent to said remaining portion of said clamping member, inclined sides on said bridge shaped portions defining symmetrical V-shaped aligned recesses, said inclined sides cooperating to form a V-shaped jaw clamp of a size depending upon the adjustment of one clamping member with respect to the other, said clamping members when adjusted to another position forming a plurality of flat surfaces in one plane, a plurality of mating projections and recesses in adjacent surfaces of said arms and grooves to prevent relative longitudinal motion between said clamping members after said V-shaped jaw clamp is adjusted with respect to a particular cable or rod diameter, each of said remaining portions having a longitudinal slot therein, and means for mounting said clamping members on said flat surfaced member to secure said rod or cable between said V-shaped jaw clamp and said flat surfaced member for one adjustment of said clamping members, and to secure a flat bar between said plurality of flat surfaces and said flat surfaced member for another adjustment of said clamping members, said means comprising bolts positioned one in each of said longitudinal slots and secured to said flat surfaced member.

RUDOLPH W. STROBEL.

No references cited.